(12) United States Patent
Shieh et al.

(10) Patent No.: US 6,421,105 B1
(45) Date of Patent: Jul. 16, 2002

(54) OPTIC DEVICE OF HIGH ILLUMINATION REFLECTING TYPE LIQUID CRYSTAL DISPLAY

(75) Inventors: Han-Ping Shieh; Yi-Pai Huang, both of Hsinchu; Chun-Chieh Chen, Taichung, all of (TW)

(73) Assignee: Wintek Corporation, Taichung (TW)

( * ) Notice: Subject to any disclaimer, the term of this patent is extended or adjusted under 35 U.S.C. 154(b) by 0 days.

(21) Appl. No.: 09/840,137

(22) Filed: Apr. 24, 2001

(51) Int. Cl.⁷ .............................................. G02F 1/1335
(52) U.S. Cl. ........................................................ 349/95
(58) Field of Search ...................... 349/95, 66

(56) References Cited

U.S. PATENT DOCUMENTS 6,092,901 A * 7/2000 Hashizume et al. .......... 349/95
6,219,111 B1 * 4/2001 Fukuda et al. ................ 349/95
6,278,500 B1 * 8/2001 Ogawa et al. ................ 349/95

* cited by examiner

*Primary Examiner*—James Dudek
(74) *Attorney, Agent, or Firm*—Rosenberg, Klein & Lee

(57) ABSTRACT

An optic device of a high illumination reflecting type liquid crystal display comprises an upper glass substrate, a liquid crystal layer, and a lower glass substrate. An upper glass substrate includes a micro lens array with a plurality of alternative arranged micro lens. The micro lens array is formed by a plurality of first elements and second elements which are arranged regularly or irregularly at the same plane. The lower glass substrate has an aluminum reflecting layer having an aluminum layer. An optic film having a high reflectivity is installed between the aluminum layer and a protecting layer.

4 Claims, 7 Drawing Sheets

OPTIC DEVICE OF HIGH ILLUMINATION REFLECTING TYPE LIQUID CRYSTAL DISPLAY

FIELD OF THE INVENTION

The present invention relates to an optic device of a high illumination reflecting type liquid crystal display, and especially to a reflective type liquid crystal display having an upper glass substrate being installed with a micro lens array having a plurality of micro lens and having a lower glass substrate the aluminum reflecting layer of which is installed with an optic film.

BACKGROUND OF THE INVENTION

In the prior art reflective type liquid crystal display, light is supplied to a display through the reflection of external light so as to provide sufficient illumination. Therefore, this kind of liquid crystal display has no built in light source so that the weight of the display is reduced. However, the reflective quality of this liquid crystal display is determined through the reflecting of external light. For the principle of specular reflection in optics, the incident light X and reflecting light Y at two sides of the normal line have the same angles (referring to FIG. 8), thus, if the incident light X and reflecting light Y are tilt, then a tilt area is formed on the liquid crystal display so that the user locates at the vertical direction of the display will not have sufficient illumination. Therefore the contrast and illumination of this liquid crystal display will reduce.

Another, referring to FIG. 9, as the liquid crystal display is rotated so as to have sufficient reflecting light, the surface reflective light on the display surface will overlap with modulated reflecting light Y so that the reflective light, such as sun light and other external light, will be seen and thus the contrast of the image is reduced.

SUMMARY OF THE INVENTION

Accordingly, the primary object of the present invention is to provide an optic device of a high illumination reflecting type liquid crystal display; wherein the first elements and second elements of a micro lens array are used to refract and focus incident light. An optic film with a preferred reflectivity is combined to the aluminum reflecting layer so as to increase the availability of external light source. Then first elements and second elements of the micro lens array will diffract the reflecting light so that the outputted diffract light can be in a correct position on the display, and thus the illumination and contrast are increased.

The various objects and advantages of the present invention will be more readily understood from the following detailed description when read in conjunction with the appended drawing.

DETAILED DESCRIPTION OF THE PREFERRED EMBODIMENTS

Figure 1:
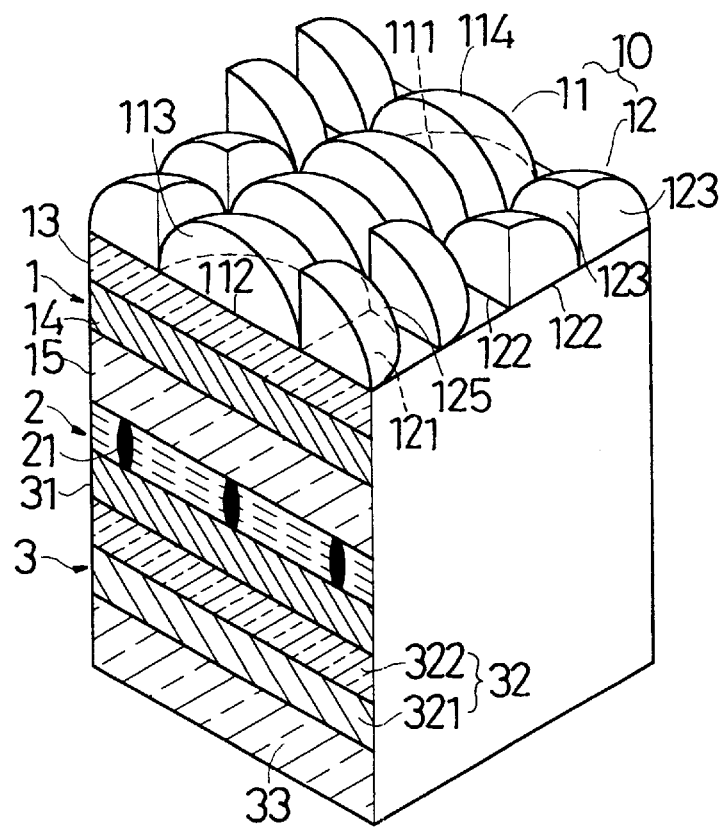
FIG. 1 is a structural perspective view of the first embodiment in the present invention.

Referring to FIGS. 1 to 6, the optic device of a high illumination reflecting type liquid crystal display of the present invention includes an upper glass substrate 1, a liquid crystal layer 2, and a lower glass substrate 3.

The upper glass substrate 1 includes a micro lens array 10 with a plurality of alternative arranged micro lens. The micro lens array 10 is formed by a plurality of first elements 11 and second elements 12 which are arranged regularly and at the same plane. The bottom of each first element 11 has a hemispherical first bottom 111 which has a straight first edge 112. The first edge 112 is extended with a first surface 113. A top edge of the first surface 113 has a first cambered surface 114 connected to another side of the first edge 112 of the first bottom 111. The second elements 12 are installed at two sides of the second element 12 and are alternatively arranged with a unit of two. The second element 12 has a second bottom 121 having a sector shape. The second bottom 121 has two vertical second edge 122. Two second edges 122 are extended upwards so as to be formed with cambered second surfaces 123. Tops of the two second surfaces are connected to a second cambered surface 125.

A polarization plate 13 is installed at the bottom of the micro lens array 10.

A phase compensation plate 14 is installed at the bottom of the polarization plate 13.

An upper glass plate 15 is installed at the bottom of the phase compensation plate 14.

A liquid crystal layer 2 is installed at the bottom of the upper glass plate 15 of the upper glass substrate 1. The liquid crystal layer 2 has a plurality of spacers 21 combined to the bottom of the upper glass plate 15.

The lower glass substrate 3 is installed at the bottom of the liquid crystal layer 2 and includes the following components.

A protecting layer 31 is installed at the bottom of the liquid crystal layer 2. The protecting layer 31 is combined to the plurality of spacers 21.

An aluminum reflecting layer 32 is installed at the bottom of the protecting layer 31. The aluminum reflecting layer 32 has an aluminum layer 321. An optic film 322 is installed between the aluminum layer 321 and the aluminum reflecting layer 32. The optic film 322 is made by alternatively vaporizing $SiO_2$ and $TiO_2$ on the aluminum layer 321.

A lower glass plate 33 is installed at the bottom of the aluminum layer 321 of the aluminum reflecting layer 32.

Figure 5:
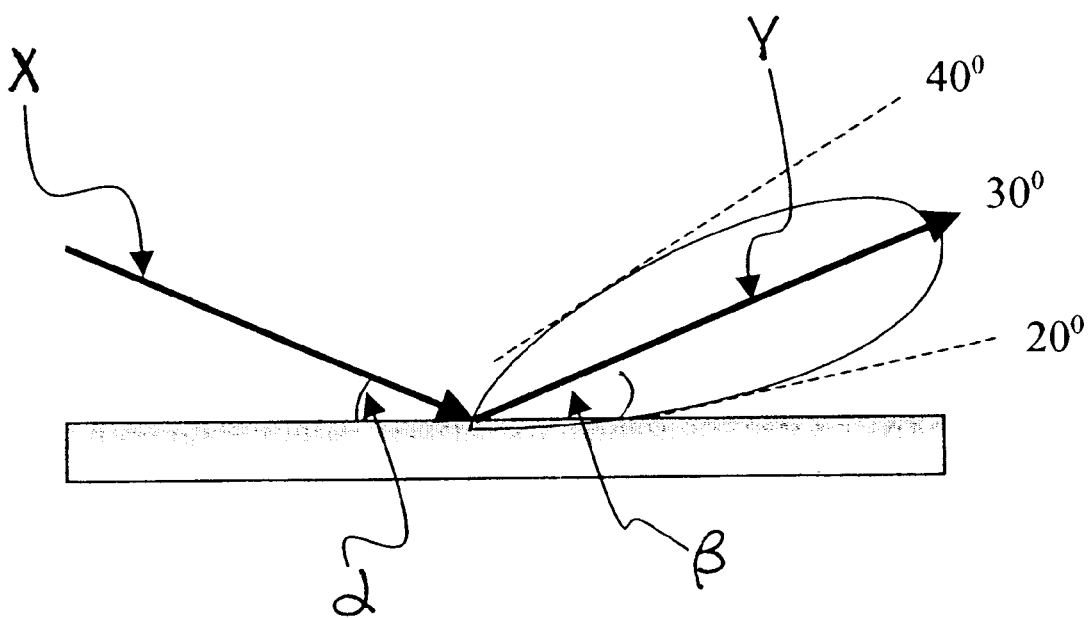
FIG. 5 shows the distribution of the incidence and reflectance of light source of the first embodiment in the present invention.

It should be noted that the first elements 11 and the second elements 12 of the micro lens array 10 have preset shapes. The first element 11 and the second element 12 have the effect of light polarization of a convex lens and the incident light X is focused to the aluminum reflecting layer 32. The aluminum reflecting layer 32 will reflect the incident light X into reflecting light Y. Then the reflecting light Y is diffracted through the first elements 11 and second elements 12 of the micro lens array 10 and then is emitted out normally (i.e., a direction normally from the upper glass substrate 1) from the upper glass substrate 1 of the present invention. Another, the optic film 322 of the aluminum reflecting layer 32 is made by alternatively vaporizing $SiO_2$ and $TiO_2$ on the aluminum layer 321 so as to be formed with a cold mirror. The reflectivity at the surface of the optic film 322 is measured through an optic spectrometer (not shown) as illustrated in FIG. 5. It is known from FIG. 5 that this structure has a very high relative reflectivity at wave lengths within the range of 400 to 780 nm. This is correspondent to an aluminum reflecting layer 32 with high reflective coefficient.

Figure 2:
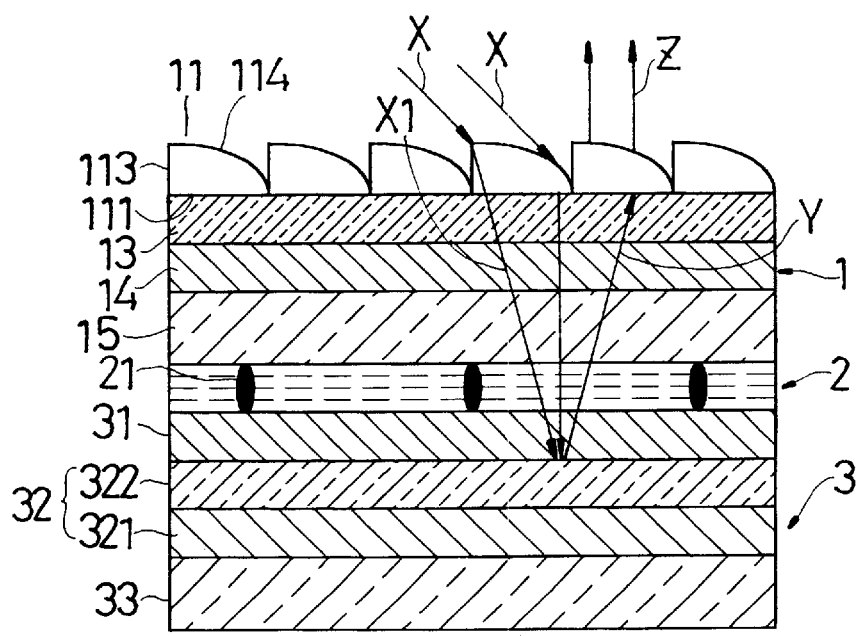
FIG. 2 is a schematic view showing the structural cross section view and light path of the first embodiment in the present invention.
Figure 3:
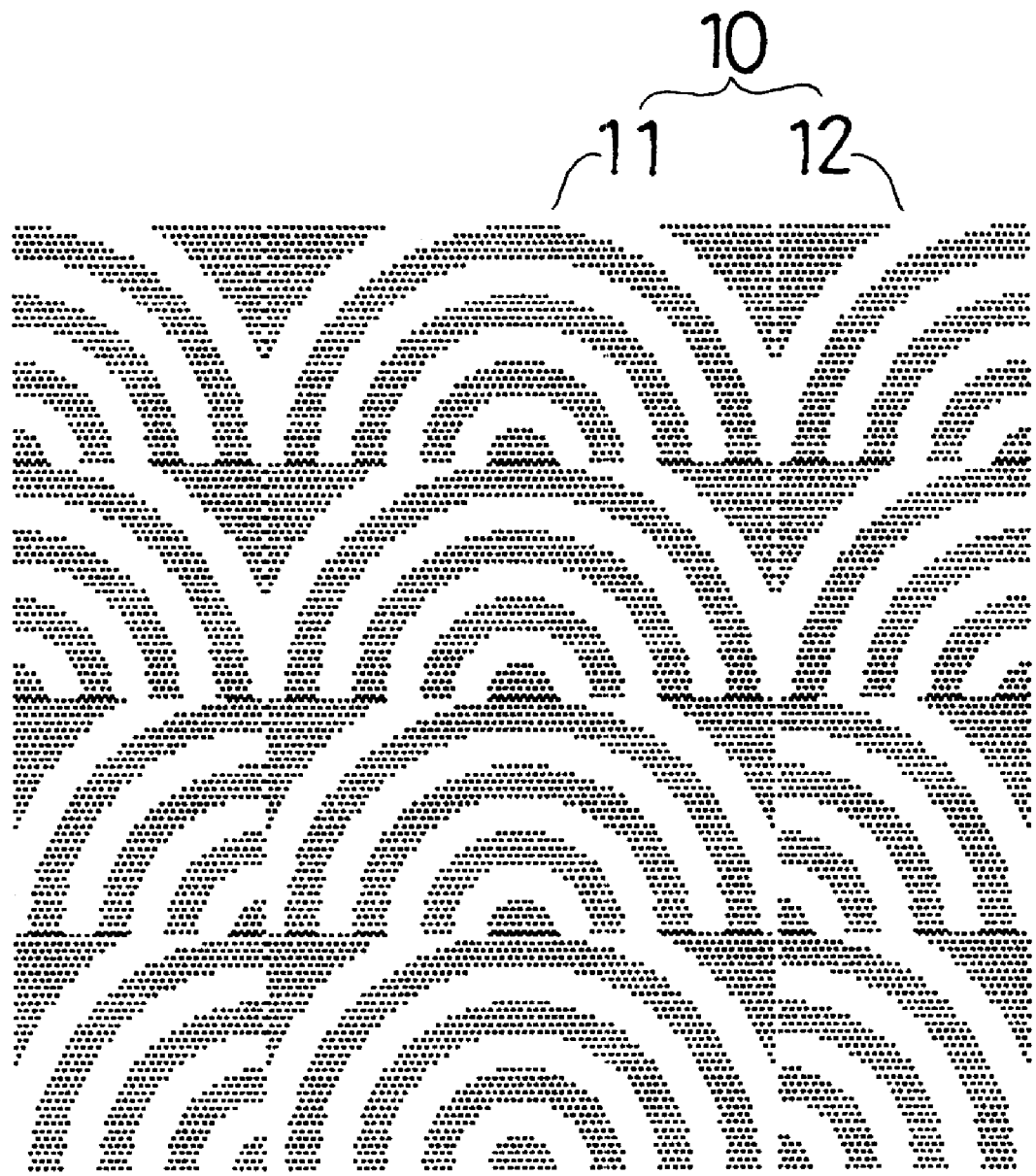
FIG. 3 is a top view of the micro lens array in the first embodiment of the present invention.
Figure 4:
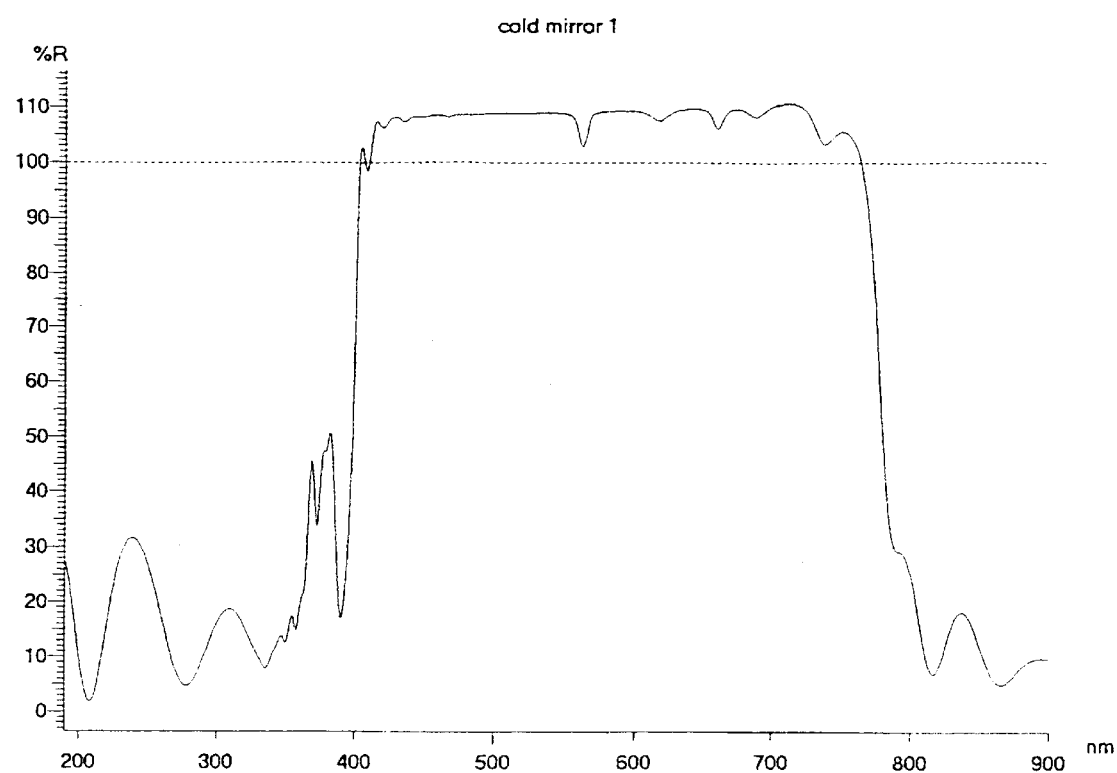
FIG. 4 shows curve of optic characteristics of the relative reflectivity of various wavelength of the aluminum reflecting layer in the first embodiment of the present invention.

In the embodiment of the present invention, the first elements 11 and second elements 12 of the micro lens array 10 are combined to the optic structure of the liquid crystal display with the aluminum reflecting layer 32. Referring to FIG. 2, when external incident light X incidents the first element 11 and second element 12 of the micro lens array 10, it is at first polarized into refracting light X1, and then the light passes through the polarization plate 13, phase compensation plate 14, upper glass plate 15, liquid crystal layer 2, and protecting layer 31. Then, it is focused on the aluminum reflecting layer 32. By the reflection of the optic film 322 of the aluminum reflecting layer 32 and the aluminum layer 321, the visible light is reflected highly efficiently into reflecting light Y. The reflecting light Y reversely passes through the protecting layer 31, liquid crystal layer 2, upper glass plate 15, phase compensation plate 14, and polarization plate 13. Then, transmitting through the first element 11 and second element 12 of the micro lens array 10, the reflecting light Y is modulated to be controlled in a normal direction so as to be formed as a diffraction light Z.

Figure 6:
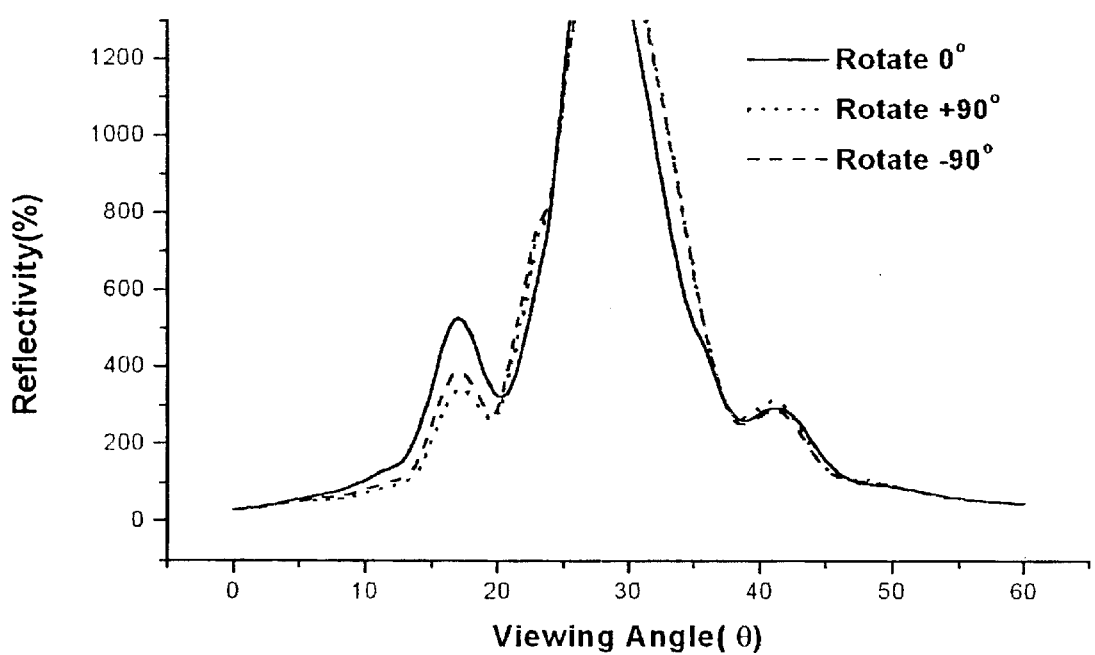
FIG. 6 shows the curve of reflectivity that the display is rotated through 90 degrees at the positive and negative orientation in the first embodiment of the present invention.

Furthermore, in the case that the external incident light X is incident into the upper glass substrate 1 with an angle of 30 degrees and the liquid crystal display of the present invention is horizontally rotated through 90 degrees clockwise and then rotated through 90 degrees counterclockwise. The reflectivity of the reflecting light Z is measured (referring to FIG. 4). The abscissa represents the visual angle from different angles and the ordinate represents the reflectivity with respective to the MgO white plate. Referring to FIGS. 5 and 6, when the external incident light X incident with an angle of 30 degrees, the specular reflection of the reflecting light Y is 30 degrees and most of the reflecting light Y distributes within the angles of +10 to –10 degrees of the specular reflecting angle β, i.e., at the range P of 20 to 40 degrees. Therefore the effect of focusing is very good.

In summary, in the present invention, the first elements 11 and second elements 12 of the micro lens array 10 are used to refract and focus incident light. An optic film 322 with a preferred reflectivity is combined to the aluminum reflecting layer 32 so as to increase the availability of external light source. Then first elements 11 and second elements 12 of the micro lens array 10 will diffract the reflecting light Y so that the outputted diffract light Z can be in a correct position on the display so as the illumination and contrast are increased.

Figure 7:
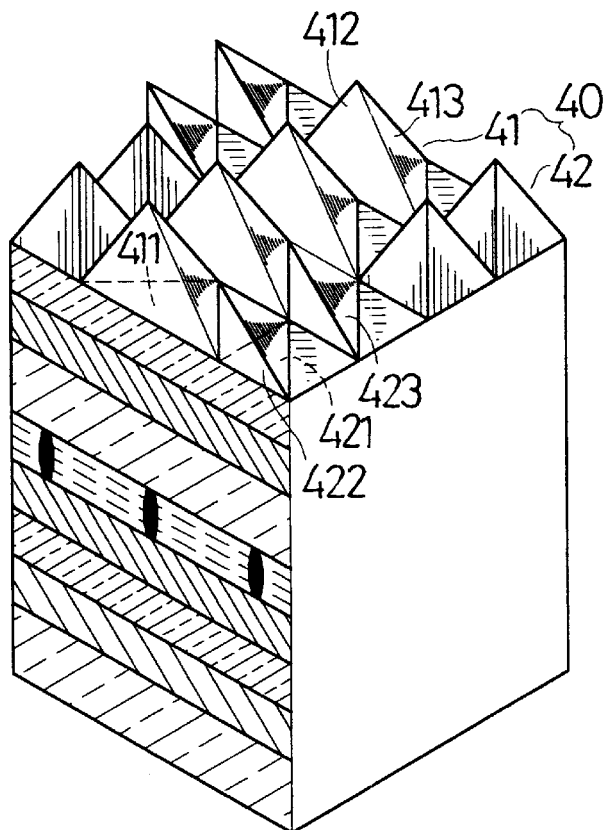
FIG. 7 is a structural perspective view of the second embodiment in the present invention.
Figure 8:
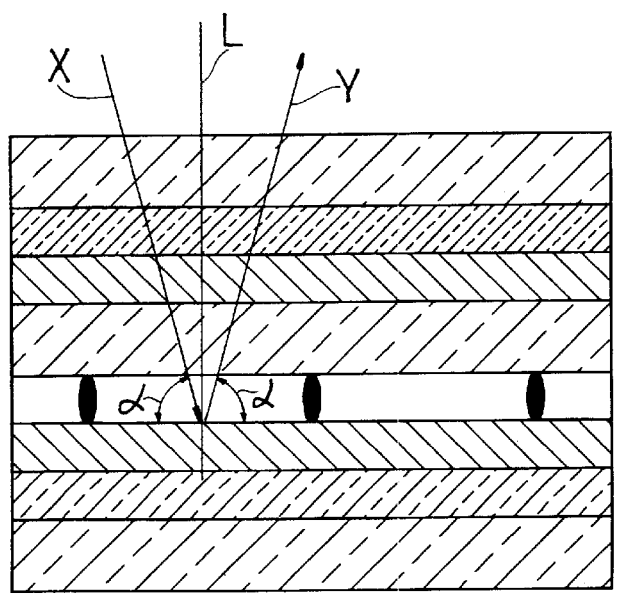
FIG. 8 is a structural cross section view of a prior art reflective type liquid crystal display.
Figure 9:
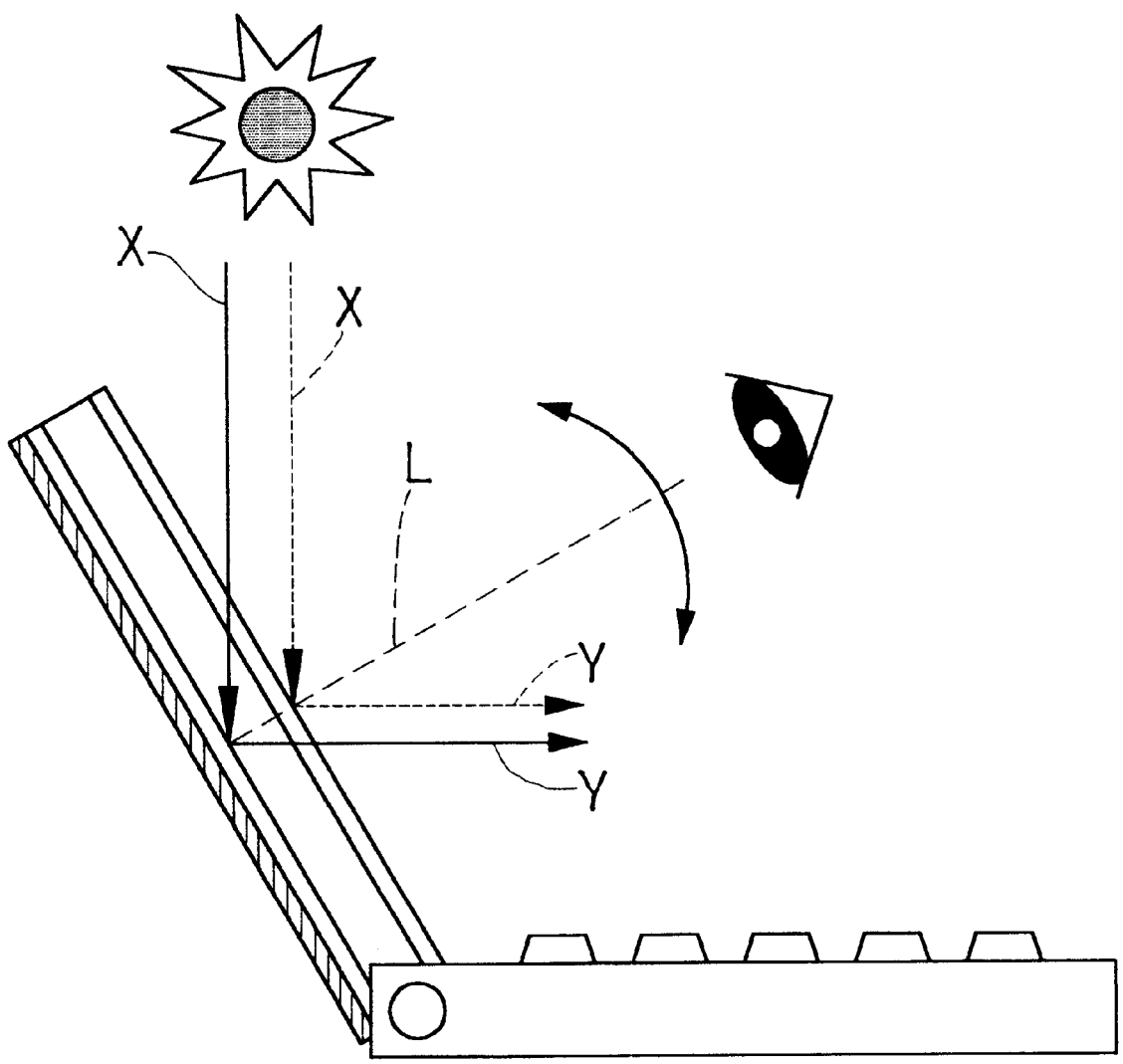
FIG. 9 is a schematic view of a prior art liquid crystal layer which reflects external light.

Of course, many embodiments modified or varied from the above embodiment can realize the present invention, however, all these modifications and variations are within the scope of the present invention. With reference to FIG. 7, the second embodiment of the present invention is illustrated. The first bottom 411 and first surface 412 of the first element 41 of the micro lens array 40 are isosceles triangle. The two top edges of the first surface 412 have two first tilt surfaces 413 connected to another side of the first bottom 411 and has a triangular shape. The second surfaces 422 extended upward from two sides of the second bottoms 421 are also triangular. The top edges of the two second surfaces 422 are connected through a tilt surface 423. By the first element 41 and second element 42 having a shape like a half cutting rhombus shape, the light source may achieve the function of the first embodiment by different ways.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An optic device of a high illumination reflecting type liquid crystal display comprising an upper glass substrate, a liquid crystal layer, and a lower glass substrate:

an upper glass substrate including a micro lens array with a plurality of alternative arranged micro lens; said micro lens array being formed by a plurality of first elements and second elements which are arranged regularly or irregularly at the same plane; a bottom of each first element having a first bottom which has a straight first edge; said first edge being extended with a first surface; a top edge of said first surface having a first connecting surface connected to another side of a first edge of said first bottom; said second elements being installed at two sides of said second element and are alternatively arranged; said second element having a second bottom connected; said second bottom having two vertical second edge connected thereto; two second edges being extended upwards with a second surface; tops of said two second surfaces being connected to another side of said second bottom of a second connecting surface;

a polarization plate being installed at said bottom of said micro lens array;

a phase compensation plate being installed at a bottom of said polarization plate; and an upper glass plate being installed at a bottom of said phase compensation plate;

the liquid crystal layer being installed at a bottom of said upper glass plate of said upper glass substrate; said liquid crystal layer having a plurality of spacers combined to said bottom of said upper glass plate; said lower glass substrate being installed at a bottom of said liquid crystal layer including following components;

a protecting layer installed at a bottom of said liquid crystal layer; said protecting layer being combined to said plurality of spacers;

an aluminum reflecting layer being installed at a bottom of said protecting layer; said aluminum reflecting layer having an aluminum layer; an optic film being installed between said aluminum layer and said aluminum reflecting layer; said optic film being made by a material of high reflectivity; and a lower glass plate being installed at a bottom of said aluminum layer of said aluminum reflecting layer.

2. The optic device of a high illumination reflecting type liquid crystal display as claim in claim 1, wherein said first bottom and the first surface of said first element have semi-round shapes, and said first connecting surface at said top edge of said first surface is a first cambered surface having a cambered shape; said second bottom and said second surface of said second element being a sector of 90 degrees; and said second connecting surface of said second bottom of said second element is a second cambered surface having a cambered shape.

3. The optic device of a high illumination reflecting type liquid crystal display as claim in claim 1, wherein said first bottom and said first surface of said first element have triangular shape, and said first connecting surfaces at tops of two sides of said first surface are first tilt surfaces; said second bottom and second surface of said second element have triangular shapes; and said second connecting surface at said top of said second surface are a second tilt surface.

4. The optic device of a high illumination reflecting type liquid crystal display as claim in claim 1, wherein said optic film is made by alternatively evaporating silicon dioxide ($SiO_2$) and titanium dioxide ($TiO_2$) on said aluminum layer.

* * * * *